May 13, 1941. C. LOSE, JR 2,242,082
FILTRATION TANK AND FILTER BED CLEANING MEANS THEREFOR
Filed Sept. 9, 1939 2 Sheets-Sheet 1

INVENTOR
CHARLES LOSE, JR.
BY Louis L. Ansart
his ATTORNEY

May 13, 1941. C. LOSE, JR 2,242,082
FILTRATION TANK AND FILTER BED CLEANING MEANS THEREFOR
Filed Sept. 9, 1939 2 Sheets-Sheet 2

INVENTOR
CHARLES LOSE, JR.
BY
ATTORNEY

Patented May 13, 1941

2,242,082

UNITED STATES PATENT OFFICE 2,242,082

FILTRATION TANK AND FILTER BED CLEANING MEANS THEREFOR

Charles Lose, Jr., Cranford, N. J.

Application September 9, 1939, Serial No. 294,097

9 Claims. (Cl. 210—128)

The present invention relates to improvements in apparatus for treating sewage and the like wherein a granular filter bed is cleaned by a cleaning device traveling over said bed, and more particularly to apparatus in which a filter bed in an elongated filter tank may be cleaned by a cleaner operated by suitable means so as to travel in an endless path and clean said filter bed throughout its extent.

Heretofore, filtration of solid-bearing liquid has in many cases been carried out in generally rectangular filter tanks containing filter beds which may be of granular material, and the filter bed has been cleaned by the passage thereover of a filter-bed cleaner. Many of these tanks have been so large in comparison with the cleaner that the cleaner might be moved over the filter bed in many different paths in cleaning all of the bed and the path of the cleaner would have to be controlled by an operator. It has also been proposed to clean elongated filter beds by one or more cleaners, each of which is reciprocated over the filter bed area to be cleaned thereby. This operation would require the use of filter bed cleaners which could be operated advantageously in opposite directions. However, many advantageous and effective filter bed cleaners are adapted to move in one direction only, and it is therefore desirable to provide apparatus in which the cleaning of such filter beds may be effected to greater advantage than heretofore.

An important object of the present invention is to provide a novel and advantageous apparatus for effecting the cleaning of the filter beds of such elongated tanks while avoiding the disadvantages of apparatus heretofore in use. Another object of the invention is to provide apparatus in which the filter bed in an elongated tank may be cleaned by a cleaner of substantially half the width of the tank, operated by means which moves the cleaner along either side of the tank in one direction, around one end of the tank, and along the other side of the tank in the opposite direction, thus enabling continuous operation of the cleaner over the filter bed in an endless path. A further object of the invention is to provide, in combination with a filter tank having a filter bed therein and a liquid jet filter bed cleaner therein moving along the wall of the tank, an endless channel along the inner side of the wall of the tank and supplied, by the head of the liquid at the effluent side of the filter bed, with filtered effluent for use in the cleaner.

In carrying out the invention in accordance with an approved embodiment of the invention, a suitable filter bed cleaner is used in an elongated tank containing a filter bed which can be completely cleaned by operation of the cleaner the length of the tank along one side and then in the opposite direction along the other side, the ends of the tank being substantially semicircular so that the cleaner may travel continuously around the tank while maintaining the same leading portion of the cleaner. The cleaner is supported at one side on the wall of the tank and is supported at the other edge on a suitable support which might be suspended from above but which is preferably in the form of a wall midway between the sides of the tank and with its ends positioned so that the cleaner may pass not only between the central support or wall and sides of the tank but also between these ends and the end walls of the tank.

The cleaner may be supported by means including a suitable rail extending around the tank on the wall of the tank and an endless rail on said wall at the middle of the tank, which endless rail may be the top of the wall of a trough to receive the dirty water from the cleaner. The dirty water may be drained from the trough in any suitable manner as by a duct passing downwardly through the central wall. The cleaner may be of a water-jet type and in order to provide clean water for this purpose there may be provided at the inner side of the wall of the tank an open-top channel which is supplied with filtered water by use of the head of the filtered water passing from the filter. The water for the jets may be drawn from said open-top channel by means of a pipe having its inlet end projecting into the water in said channel.

The cleaner may be moved by means including an endless sprocket chain on large sprocket wheels turning about vertical axes.

Other objects, features and advantages will appear upon consideration of the following detailed description and of the drawings in which.

Figure 1:
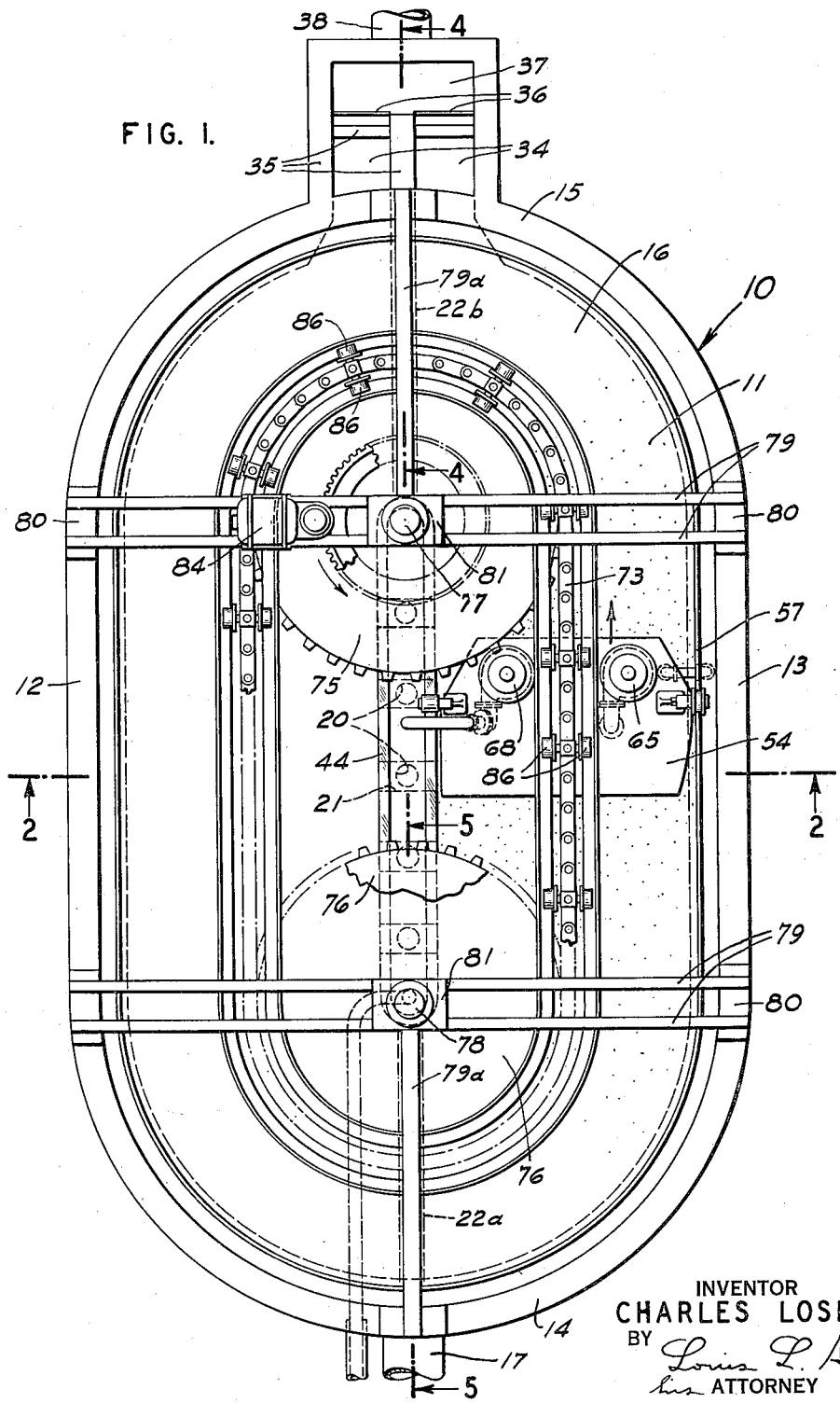
Fig. 1 is a top plan view of apparatus embodying one form of the invention.

Referring to the drawings, the apparatus illustrated comprises a filter tank 10 of elongated form. In order to enable continuous cleaning of a filter bed 11 preferably composed of granular material, such as sand, the tank may be made with parallel side walls 12 and 13 and semi-circular end walls 14 and 15 so that a filter bed cleaner substantially half as wide as the tank may be passed in one direction along one side of the tank, around an end and back along the other side of the tank. The filter bed cleaner may of course be supported at its outer edge on the wall of the tank. To support the cleaner at its inner edge, there may be provided a longitudinal support or wall 15a substantially midway between the side walls 12 and 13 and extending substantially to the centers of the semi-circular end walls 14 and 15, thus providing in the tank, an endless filter channel 16 containing the endless filter bed 11. The solid bearing liquid to be filtered may be introduced at one end of the tank through a pipe 17 into a duct 18 formed in bottom 19 of the filter tank and located at the base of the wall 15a.

The duct 18 extends substantially the length of the wall 15a and connects at certain intervals with upwardly extending ducts 20 which in turn connect at their upper ends with transverse ducts 21 discharging from the wall into the filter channel 16 beneath the normal level of the liquid in the filter channel.

Figure 2:
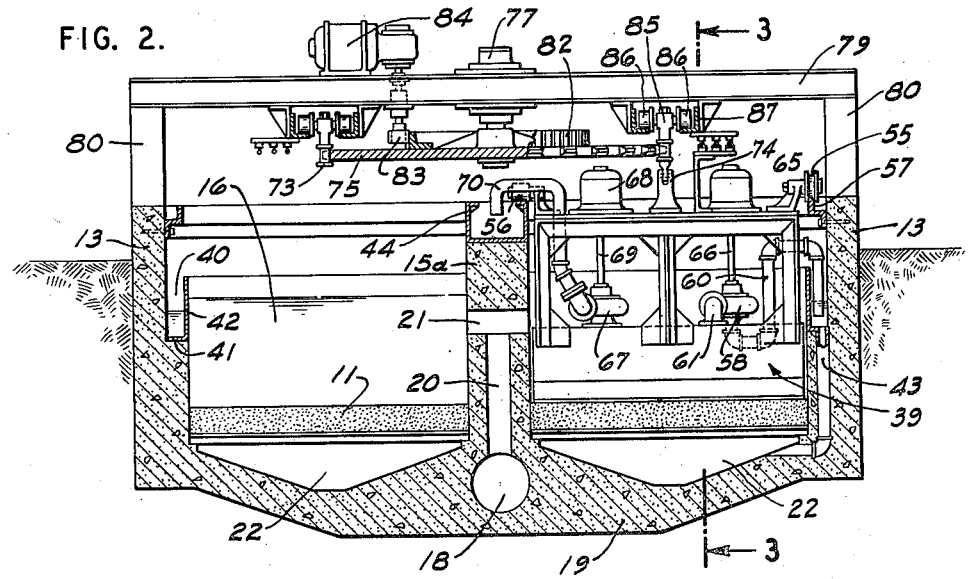
Fig. 2 is a view in section taken along the line 2—2 of Fig. 1.
Figure 3:
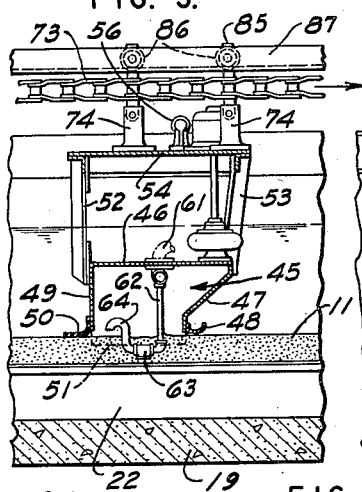
Fig. 3 is a sectional view along the line 3—3 of Fig. 2.

The liquid in the filter channel passes downwardly through the filter bed 11 into chambers or channels 22 which are separated by a partition 22a at the entrance end of the tank above the duct 18. These channels are relatively shallow near the partition 22a and gradually increase in depth toward the other or discharge end of the tank. As shown in Fig. 2, each channel has, throughout the greater part of its length, inclined sides leading down to the central portion of the channel so that any solids in the filtered liquid or filtrate will tend to pass down to the center of the channel and be carried along to the discharge end of the tank where they can more readily be removed.

Figure 4:
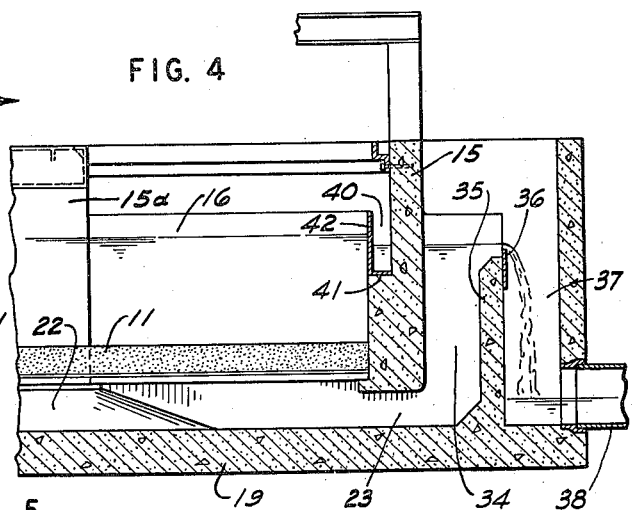
Fig. 4 is a section taken along the line 4—4 of Fig. 1.

As illustrated in Fig. 4, the channels 22, which are separated at the discharge end of the tank by a partition 22b, discharge into passages 23 in the end wall 15 so that the effluent, of filtered liquid or filtrate, passes into effluent or weir chambers 34 at the outside of the tank and having outer walls 35 provided with weirs 36 to determine the height of liquid in the chambers 34 and the head against which the liquid in the filter chamber passes downwardly through the filter bed. Liquid discharged over the weirs 36 falls into a chamber 37 communicating at its lower part with a pipe 38 from which the filtered liquid is discharged from the apparatus.

The cleaning of the filter bed may be effected by a traveling cleaner 39 in which the cleaning is effected by means of a water jet device. Although the water for such jet devices has frequently been taken from the unfiltered sewage, provision is made in the present apparatus for taking the wash liquid or water from the filtered liquid. To this end the tank may be provided at its inner surface with an open-top channel 40 at the inner surface of the wall of the tank and having its inner wall at a level slightly above the level of the liquid in the filter channel.

Preferably this channel is formed by reducing the thickness of the tank wall at its inner side, so as to leave at the inside of the tank a shoulder 41, and using an angle 42 with one flange resting on the shoulder 41 and the other extending upwardly in extension of the inner surface of the wall beneath the shoulder. The channel 40 may be kept full of filtered liquid to a level corresponding to that established by the weirs 36 by means including a duct 43 connecting at one end with one channel 22 and at the other end with the bottom of the channel 40. In order to provide for the discharge from the apparatus of dirty water from the cleaner 39, there may be provided at the top of the support or wall 15a, a trough 44 open at its top.

The cleaner 39 may include a usual chamber or caisson 45 closed at its top 46 and having a front wall 47 with a deflector 48 at its lower end so that material in front of the cleaner will pass beneath the deflector 48 and into the chamber. At its rear the chamber 45 is provided with a wall 49 having at its bottom a flexible sealing member 50, so as to prevent entrance of material at the rear of the chamber. The chamber is also provided with side walls 51 which may project downwardly into the filter bed. The chamber or caisson 45 may be suspended by suitable members 52 and 53 from a platform 54 which in turn may be supported by wheels 55 and 56 supported, respectively, on a rail 57 secured to the outer wall of the tank and on the side wall of the trough 44.

The wheel or roller 55 is preferably grooved to receive the upright flange of the rail 57, the wheel 56 being preferably in the form of a straight roller resting on the upper edge of the side wall of the trough 44, which edge serves as a rail extending around the top of the partition at the edge thereof. The rail 57 extends around the tank at the inner surface of the wall thereof and the end walls of the trough 44 may be curved so as to be concentric with the rail 57 at the ends of the tank.

Mounted upon the top of the chamber 45 is a pump 58 arranged to draw water from the channel 40 through a pipe 60 and discharge the same through a pipe 61 to a water jet device comprising pipes 62 projecting down into jet devices 63 to draw up through tubes 64 liquid and granular material from the bottom of the bed and discharge it above the level of the filter bed in the chamber 45. The jet devices 63 may be of a type disclosed in my copending application Serial No. 221,382, filed July 26, 1938.

Figure 5:
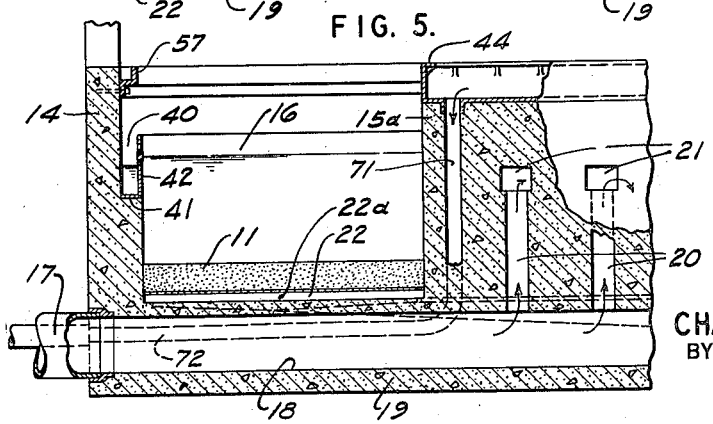
Fig. 5 is a section taken along the line 5—5 of Fig. 1.

The sand thus raised from the filter bed falls back on the bed and the solids separated from this sand in this action remain in the dirty water in the chamber 45. As illustrated, the pump 58 may be vertically arranged so that it may be driven from a motor 65 on the platform 54 through a shaft 66. Mounted at another point on the top of the chamber 45 is a pump 67 driven from a motor 68 on the platform 54 and connected with the pump 67 by means of a shaft 69. The dirty water drawn from the chamber by means of the pump 67 may be discharged through a pipe 70 into the trough 44 and may pass therefrom (see Fig. 5) downwardly through a duct 71 in the wall 15a and out through a duct 72 in the bottom of the tank and leading to the outside thereof. If desired, the dirty water discharged through the duct 72 may be added to the unfiltered liquid passing to the filter tank.

Obviously the filter bed cleaner 39 may be made to travel over the filter bed while supported by the platform 54 on the wall of the trough 44 and on the rail 57. The filter bed cleaner may be driven around the tank in various ways. For example, as disclosed in the drawings, it may be driven by an endless sprocket chain 73 connected to the platform 54 by means including one or more posts 74 projecting upwardly from said platform, midway between the edges on which the rolls or wheels 55 and 56 are mounted. The sprocket chain 73 extends around sprocket wheels 75 and 76 carried by vertical shafts 77 and 78 respectively, which may be supported on transverse members 79 extending across the tank from side to side and supported on posts 80 at the edges of the tank.

The members 79 are arranged in pairs and not only support members 81 in which the shafts 77 and 78 are mounted, but the transverse members 79 over the sprocket 75 are used to support driving means for a gear or circular rack 82 fixed to the sprocket wheel 75 through which the endless chain may be driven. The pairs of transverse members 79 may be braced against lateral bending by means of members 79a extending therefrom to posts 80 on the ends of the tank. Meshing with the gear or rack 82 is a pinion 83 driven through suitable connections from a motor 84 on the corresponding pair of members 79. The sprocket chain 73 should receive support in addition to that obtained from the sprocket wheels 75 and 76. To this end the sprocket chain may be provided at suitable intervals with upright posts 85 carrying, on opposite sides thereof, wheels or rolls 86 resting on the horizontal flanges of angles 87 suspended from members 79 and 79a and forming tracks by which the chain is supported.

The operation of the apparatus is substantially as follows: Solid-bearing liquid, such as sewage, flows into the tank through pipe 17, duct 18, upwardly extending ducts 20 in the wall 15a, and transverse ducts 21. The ducts 20 and 21 are so spaced as to distribute the influent sewage substantially uniformly along the length of the tank, or in other words along the endless filter channel 16. Due to effective head at the filter bed 11, the liquid will pass therethrough and solids therein will be retained by the filter bed. The filtered effluent will pass over the weirs 36 and be discharged from the apparatus.

The cleaner 39 may be operated continuously or intermittently. When the cleaning operation is being performed, the motor 84, acting through gears 82 and 83, drives sprocket wheel 75 and sprocket chain 73 which is connected with platform 54 from which the cleaner 39 is suspended. At the same time the motor 65 drives the pump 58 to supply clean water from the channel 40 to the pipe 64 of the jet devices whereby contaminated sand is washed in the chamber 45. The cleaned sand drops back on the filter bed leaving the waste solids in the dirty water in the chamber or caisson.

The motor 68 is also in operation to drive the pump 67 which draws the dirty water from the chamber and delivers it to the trough 44 for discharge through the ducts 71 and 72. This operation may be kept up as long as desired.

It should be understood that various features may be changed and that certain features may be used without others, without departing from the true spirit and scope of the invention.

What I claim is:

1. In apparatus of the class described, the combination of an elongated filter tank with a filter bed therein, receiving solid bearing liquid and discharging filtered liquid, said tank having an endless wall with substantially parallel sides and substantially semi-circular ends, a central longitudinal support midway between said sides and terminating at each end adjacent to the center of curvature of the corresponding semi-circular end, a rail around the tank supported on said endless wall, a rail around the edge of said support, a filter bed cleaner mounted on said rails to travel therealong and to be held against transverse movement with reference to one of said rails, and means to drive said filter bed cleaner along said rails and turn the same in passing around the ends of the same.

2. In apparatus of the class described, the combination of an elongated filter tank with a filter bed therein, receiving solid bearing liquid and discharging filtered liquid, said tank having an endless wall with substantially parallel sides and substantially semi-circular ends, a central longitudinal trough midway between said sides at the upper part of the tank and terminating at each end at substantially the center of curvature of the corresponding semi-circular end, a drain duct to discharge liquid from said trough to the outside of the tank, a rail around the tank supported by the endless wall thereof, a rail supported on the sides of said trough and extending therearound, a fluid-jet filter bed cleaner mounted to travel along said rails, means to drive said filter bed cleaner and turn the same as it passes around the ends of the tank, anad means to discharge dirty liquid from said cleaner into said trough.

3. In apparatus of the class described, the combination of an elongated filter tank with a filter bed therein, receiving solid bearing liquid and discharging filtered liquid, said tank having an endless wall with substantially parallel sides and substantially semi-circular ends, a central longitudinal support midway between said sides and terminating at each end adjacent to the center of curvature of the corresponding semi-circular end, a rail around the tank supported on said endless wall, a rail around the edge of said support, an endless channel around said tank at the inner surface of said wall, means for supplying filtered liquid to said endless channel, a liquid-jet filter bed cleaner mounted to travel along said rails and adapted to take filtered liquid from said channel, means to drive said filter bed cleaner around the tank, and supporting means for said driving means located above said tank and supported on said endless wall.

4. In apparatus of the class described, the combination of an elongated filter tank with a filter bed therein, receiving solid bearing liquid above said filter bed and discharging filtered liquid from beneath the bed, said tank having an endless wall with substantially parallel sides and substantially semi-circular ends, a central longitudinal dirty-liquid trough midway between said sides at the upper part of the tank and terminating at each end adjacent to the center of curvature of the corresponding semi-circular end, an endless channel around said tank at said endless wall, a liquid-jet filter bed cleaner for said filter bed, means for driving said filter bed cleaner around the tank, means for supplying liquid from said endless channel to said cleaner, and means for discharging dirty liquid from said cleaner into said trough.

5. In apparatus of the class described, the combination of an elongated filter tank with a filter bed therein, receiving solid bearing liquid and discharging filtered liquid, said tank having an endless wall with substantially parallel sides and substantially semi-circular ends, a central longitudinal support midway between said sides and terminating at each end adjacent to the center of curvature of the corresponding semi-circular end, a rail around the tank supported on said endless wall, a rail around the edges of said support, a filter bed cleaner mounted to travel along said rails, means to drive said filter bed cleaner around the tank including a traveling endless member above the path of and connected to said cleaner, and supporting means for such driving means carried by said endless wall.

6. In apparatus of the class described, the combination of an elongated filter tank with a filter bed therein, receiving solid bearing liquid above said bed and discharging filtered liquid from below said bed, said tank having an endless wall with substantially parallel sides and substantially semi-circular ends, a central longitudinal support midway between said parallel sides and terminating at each end adjacent to the center of curvature of the corresponding semi-circular end, an endless filter bed in said tank extending around said support and between the same and the inner surface of said wall of the tank, a traveling overhead liquid-jet cleaner for the filter bed of a width to extend from said support to the inner surfaces of said side walls and ends, means for driving said cleaner along said endless filter bed, means for withdrawing filtered liquid comprising a drain channel beneath said filter bed, a weir chamber receiving liquid from said drain channel and a weir determining the level of the liquid in said weir chamber and said tank, a supply channel at the inner side of said endless wall and connected with said drain channel, and means for supplying liquid from the supply channel to the cleaner.

7. In apparatus of the class described, the combination of an elongated filter tank with a filter bed therein, having an endless wall with parallel sides and substantially semi-circular ends, a central longitudinal support midway between said parallel sides and terminating at each end adjacent to the center of curvature of the corresponding semi-circular end, an endless filter bed in said tank extending around said support and between the same and the inner surface of said wall of the tank, a traveling overhead cleaner for the filter bed of a width to extend from said support to the inner surfaces of said side walls and semi-circular ends, and means for driving said cleaner along said endless filter bed including an endless chain attached to said cleaner, sprocket wheels for said chain rotating about parallel vertical axes, supporting means for said chain including brackets projecting upwardly from the chain at suitable intervals and provided with rollers at opposite sides thereof, rails at opposite sides of the chain and above the same on which the chain supporting rollers rest and connections between two adjacent brackets and the cleaner whereby the cleaner will be turned as the chain passes around the sprocket wheels.

8. In apparatus of the class described, the combination of an elongated tank with a filter bed therein, having an endless wall with substantially parallel sides and substantially semi-circular ends, a central longitudinal support midway between said parallel sides and terminating at each end adjacent to the center of curvature of the corresponding semi-circular end, an endless filter bed in said tank extending around said support and between the same and the inner surface of said wall of the tank, an outer rail extending around the tank at the top of said endless wall, an inner rail extending around the top of said support, a traveling overhead cleaner for the filter bed of a width to extend from said support to the inner surfaces of said side walls and ends, supporting means for said cleaner including a grooved roller resting on said outer rail and preventing transverse movement with respect to said outer rail and a plain roller resting on the inner rail, means for driving said cleaner along said endless filter bed and turning it at the ends of the bed, a trough on the top of said support, means for drawing dirty liquid from said cleaner and discharging it into said trough, and means for passing the dirty liquid in said trough to the outside of said tank.

9. In apparatus of the class described, the combination of an elongated tank with a filter bed therein, having an endless wall with substantially parallel sides and substantially semi-circular ends, a central longitudinal support midway between said parallel sides and terminating at each end adjacent to the center of curvature of the semi-circular end, an endless filter bed in said tank extending around said support and between the same and the inner surface of said wall of the tank, a traveling overhead cleaner for the filter bed of a width to extend from said support to the inner surfaces of said side walls and semi-circular ends, means for supplying liquid to be filtered including an influent duct in the lower part of said support and discharge ports at opposite sides of said support, and means for supporting and driving said cleaner around said filter bed including a rail extending around the edge of the top of the support, a rail extending around the tank and supported by said endless wall, and wheels connected with said cleaner and resting on said rails.

CHARLES LOSE, Jr.